United States Patent
Kwak et al.

(10) Patent No.: US 11,678,341 B2
(45) Date of Patent: Jun. 13, 2023

(54) METHODS AND APPARATUS FOR SCHEDULING OF MULTIPLE PUSCH/PDSCH

(71) Applicant: QUALCOMM Incorporated, San Diego, CA (US)

(72) Inventors: Yongjun Kwak, San Diego, CA (US); Huilin Xu, Temecula, CA (US); Yuchul Kim, San Diego, CA (US); Wanshi Chen, San Diego, CA (US); Peter Gaal, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/219,752

(22) Filed: Mar. 31, 2021

(65) Prior Publication Data

US 2022/0322404 A1    Oct. 6, 2022

(51) Int. Cl.
| | |
|---|---|
| H04W 56/00 | (2009.01) |
| H04W 72/23 | (2023.01) |
| H04W 72/1263 | (2023.01) |
| H04W 76/27 | (2018.01) |
| H04L 1/1867 | (2023.01) |
| H04W 72/0446 | (2023.01) |
| H04L 1/1812 | (2023.01) |

(52) U.S. Cl.
CPC ............ *H04W 72/23* (2023.01); *H04L 1/1819* (2013.01); *H04L 1/1896* (2013.01); *H04W 72/0446* (2013.01); *H04W 72/1263* (2013.01); *H04W 76/27* (2018.02)

(58) Field of Classification Search
CPC ............. H04W 72/1289; H04W 76/27; H04W 1/1819; H04W 1/1896; H04W 72/0446; H04W 72/1263
USPC ......................................................... 370/329
See application file for complete search history.

(56) References Cited

U.S. PATENT DOCUMENTS

| | | | |
|---|---|---|---|
| 2021/0007127 A1* | 1/2021 | Hwang | H04W 72/1289 |
| 2021/0112583 A1* | 4/2021 | Gao | H04L 5/0044 |
| 2021/0144743 A1* | 5/2021 | Rastegardoost | H04W 72/1257 |
| 2021/0320760 A1* | 10/2021 | Rastegardoost | H04L 5/0055 |
| 2022/0210824 A1* | 6/2022 | Ying | H04B 7/0689 |
| 2022/0216944 A1* | 7/2022 | Muruganathan | H04W 72/0446 |

\* cited by examiner

*Primary Examiner* — Sai Ming Chan
(74) *Attorney, Agent, or Firm* — Procopio, Cory, Hargreaves & Savitch LLP

(57) ABSTRACT

The present disclosure relates to methods and devices for wireless communication of an apparatus, e.g., a UE and/or a base station. The apparatus may receive, from a base station, an indication of a plurality of transmission schedules for at least one of a plurality of PUSCHs or a plurality of PDSCHs, the indication including a time gap prior to a transmission of each of the plurality of PUSCHs or each of the plurality of PDSCHs. The apparatus may also receive, from the base station, DCI identifying at least one transmission schedule for at least one PUSCH of the plurality of PUSCHs or at least one PDSCH of the plurality of PDSCHs. Further, the apparatus may transmit, to the base station, the at least one PUSCH or receive, from the base station, the at least one PDSCH based on the at least one transmission schedule in the received DCI.

28 Claims, 13 Drawing Sheets

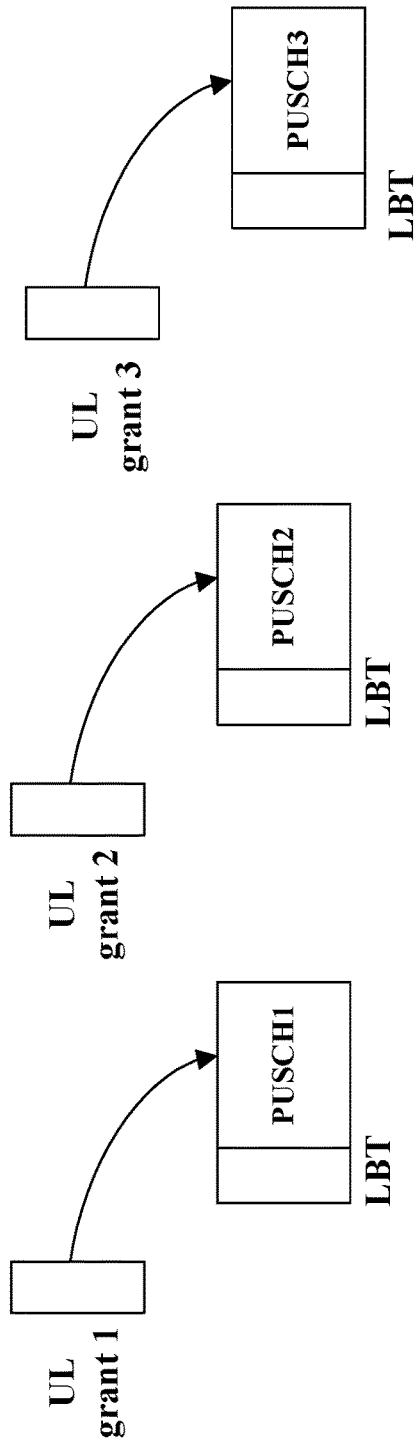
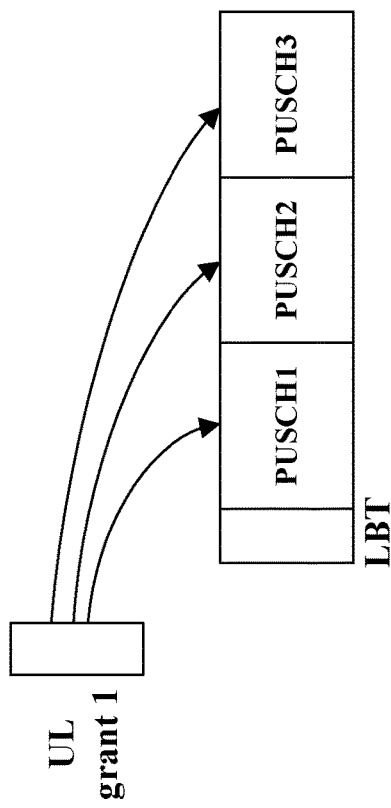
FIG. 4A
FIG. 4B

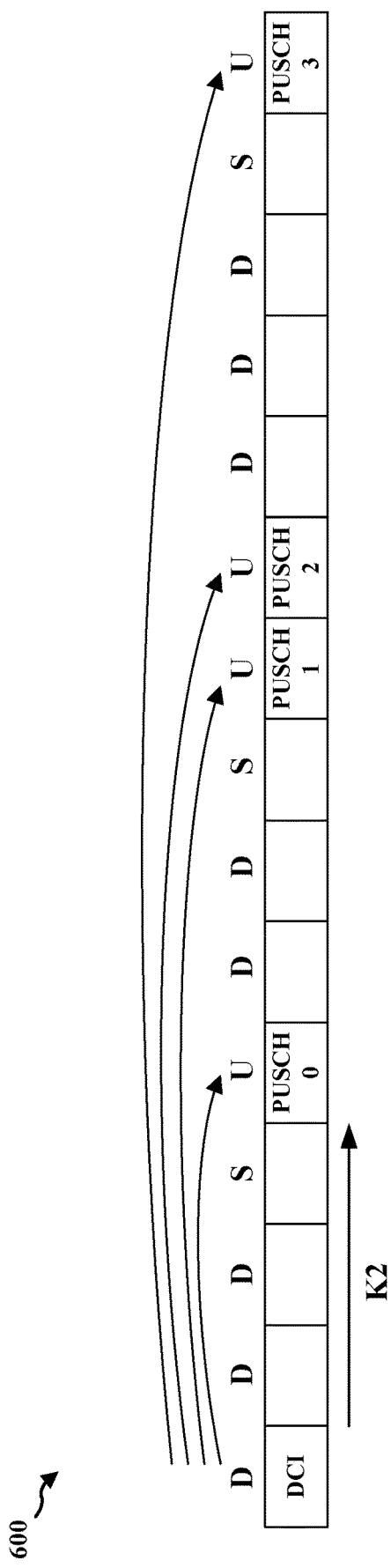
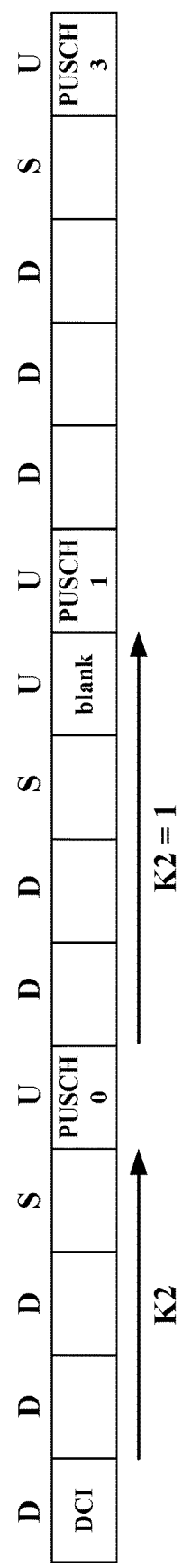
FIG. 6A
FIG. 6B

| DCI | PUSCH 0 | PUSCH 0 | PUSCH 0 | PUSCH 1 | PUSCH 1 | PUSCH 1 | PUSCH 2 | PUSCH 2 | PUSCH 2 | PUSCH 3 | PUSCH 3 | PUSCH 3 |
|---|---|---|---|---|---|---|---|---|---|---|---|---|

| DCI | PUSCH 0 | PUSCH 1 | PUSCH 2 | PUSCH 3 | PUSCH 0 | PUSCH 1 | PUSCH 2 | PUSCH 3 | PUSCH 0 | PUSCH 1 | PUSCH 2 | PUSCH 3 |
|---|---|---|---|---|---|---|---|---|---|---|---|---|

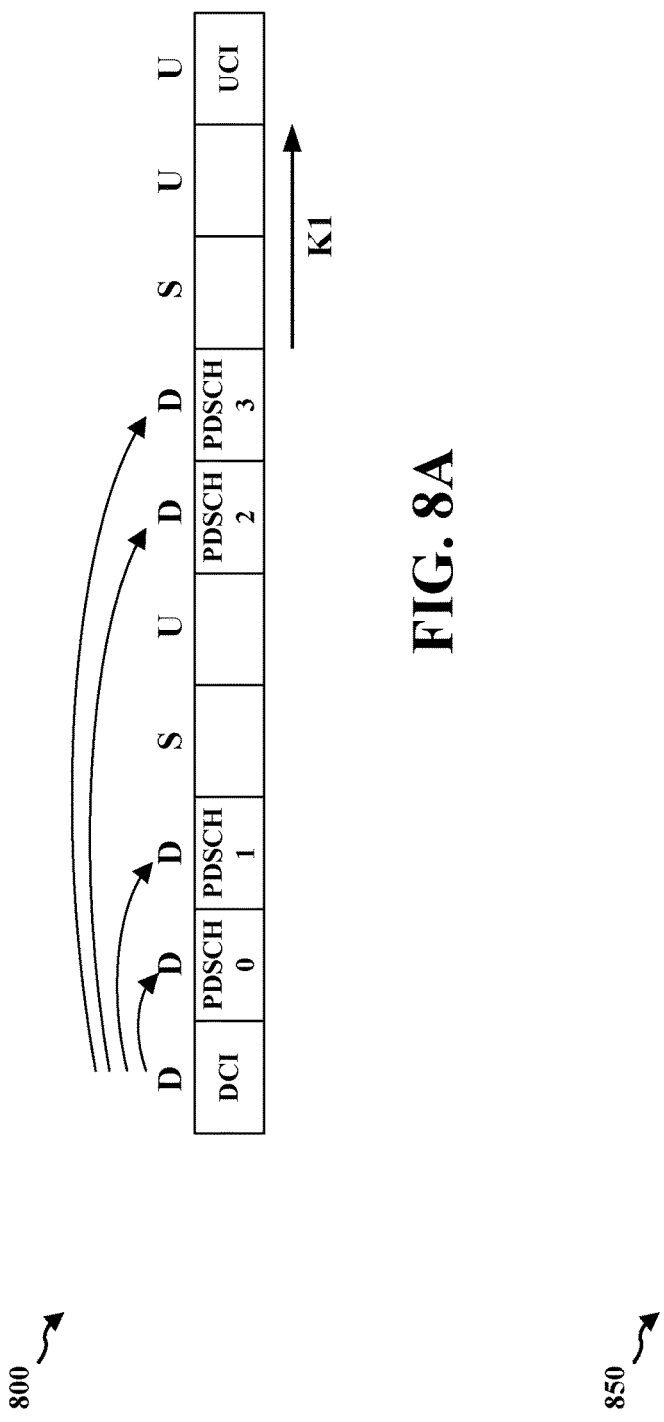
FIG. 8A
FIG. 8B

METHODS AND APPARATUS FOR SCHEDULING OF MULTIPLE PUSCH/PDSCH

BACKGROUND

Technical Field

The present disclosure relates generally to communication systems, and more particularly, to physical uplink shared channel (PUSCH) and physical downlink shared channel (PDSCH) scheduling in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs. The apparatus may also receive, from the base station, downlink control information (DCI) identifying at least one transmission schedule for at least one PUSCH of the plurality of PUSCHs or at least one PDSCH of the plurality of PDSCHs. Additionally, the apparatus may transmit, to the base station, the at least one PUSCH or receive, from the base station, the at least one PDSCH based on the at least one transmission schedule in the received DCI.

In another aspect of the disclosure, a method, a computer-readable medium, and an apparatus are provided. The apparatus may be a base station. The apparatus may transmit, to a user equipment (UE), an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs. The apparatus may also transmit, to the UE, downlink control information (DCI) identifying at least one transmission schedule for at least one PUSCH of the plurality of PUSCHs or at least one PDSCH of the plurality of PDSCHs. Additionally, the apparatus may receive, from the UE, the at least one PUSCH or transmit, to the UE, the at least one PDSCH based on the at least one transmission schedule in the transmitted DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A is a diagram illustrating an example of single PUSCH scheduling.

FIG. 4B is a diagram illustrating an example of multiple PUSCH scheduling.

FIG. 6A is a diagram illustrating an example of multiple slots for multi-PUSCH scheduling.

FIG. 6B is a diagram illustrating an example of multiple slots for multi-PUSCH scheduling.

FIG. 7A is a diagram illustrating an example of multiple slots for multi-PUSCH scheduling.

FIG. 7B is a diagram illustrating an example of multiple slots for multi-PUSCH scheduling.

FIG. 8A is a diagram illustrating an example of multiple slots for multi-PDSCH scheduling.

FIG. 8B is a diagram illustrating an example of multiple slots for multi-PDSCH scheduling.

DETAILED DESCRIPTION

Figure 1:
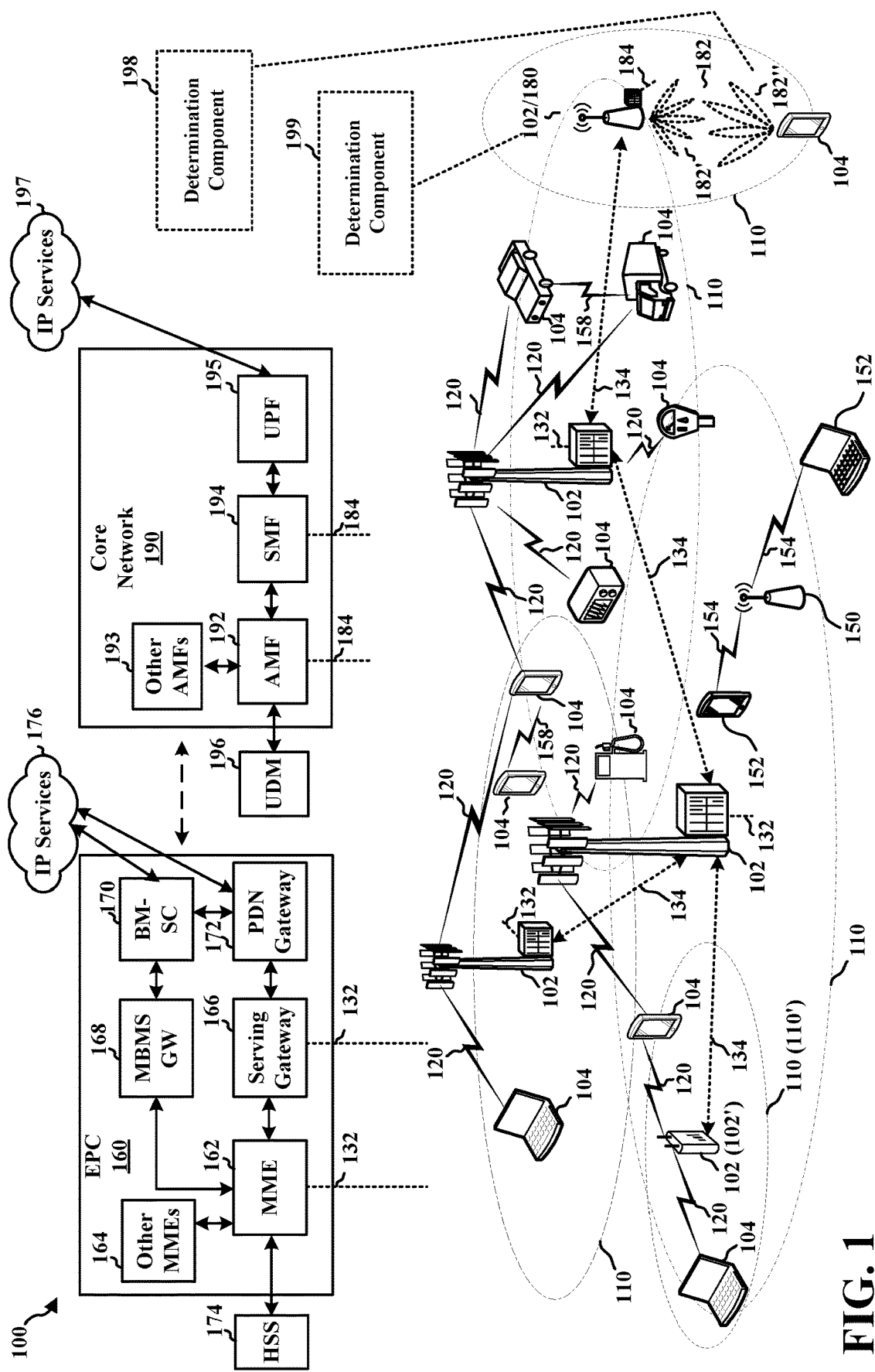
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)

(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a determination component 198 configured to receive, from a base station, an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs. Determination component 198 may also be configured to receive, from the base station, downlink control information (DCI) identifying at least one transmission schedule for at least one PUSCH of the plurality of PUSCHs or at least one PDSCH of the plurality of PDSCHs. Determination component 198 may also be configured to transmit, to the base station, the at least one PUSCH or receive, from the base station, the at least one PDSCH based on the at least one transmission schedule in the received DCI.

Referring again to FIG. 1, in certain aspects, the base station 180 may include a determination component 199 configured to transmit, to a user equipment (UE), an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs. Determination component 199 may also be configured to transmit, to the UE, downlink control information (DCI) identifying at least one transmission schedule for at least one PUSCH of the plurality of PUSCHs or at least one PDSCH of the plurality of PDSCHs. Determination component 199 may also be configured to receive, from the UE, the at least one PUSCH or transmit, to the UE, the at least one PDSCH based on the at least one transmission schedule in the transmitted DCI.

Although the following description may be focused on 5G NR, the concepts described herein may be applicable to other similar areas, such as LTE, LTE-A, CDMA, GSM, and other wireless technologies.

Figure 2:
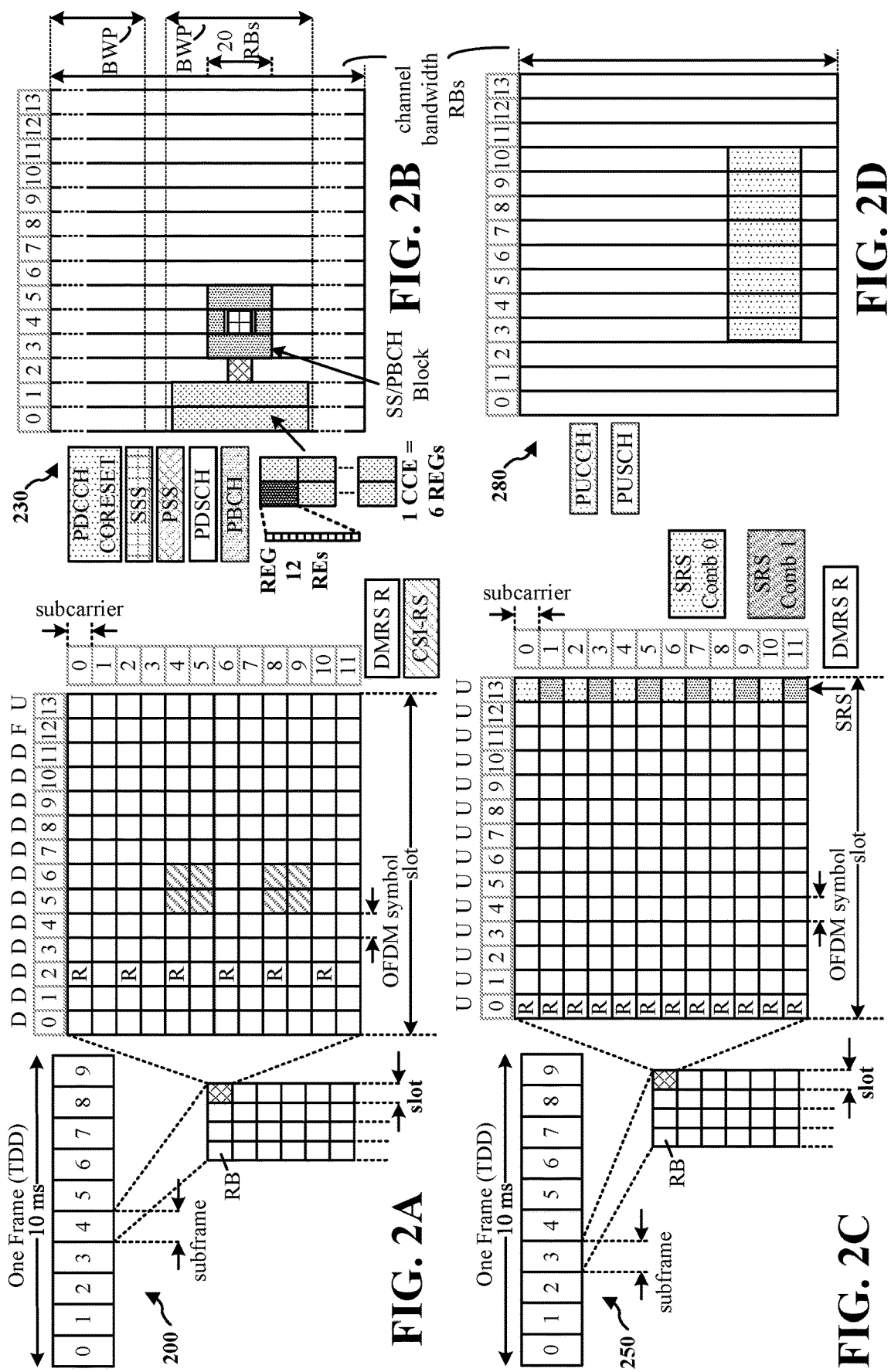
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (HACK)) feedback. The PUSCH carries data, and may additionally be used to carry a buffer status report (BSR), a power headroom report (PHR), and/or UCI.

Figure 3:
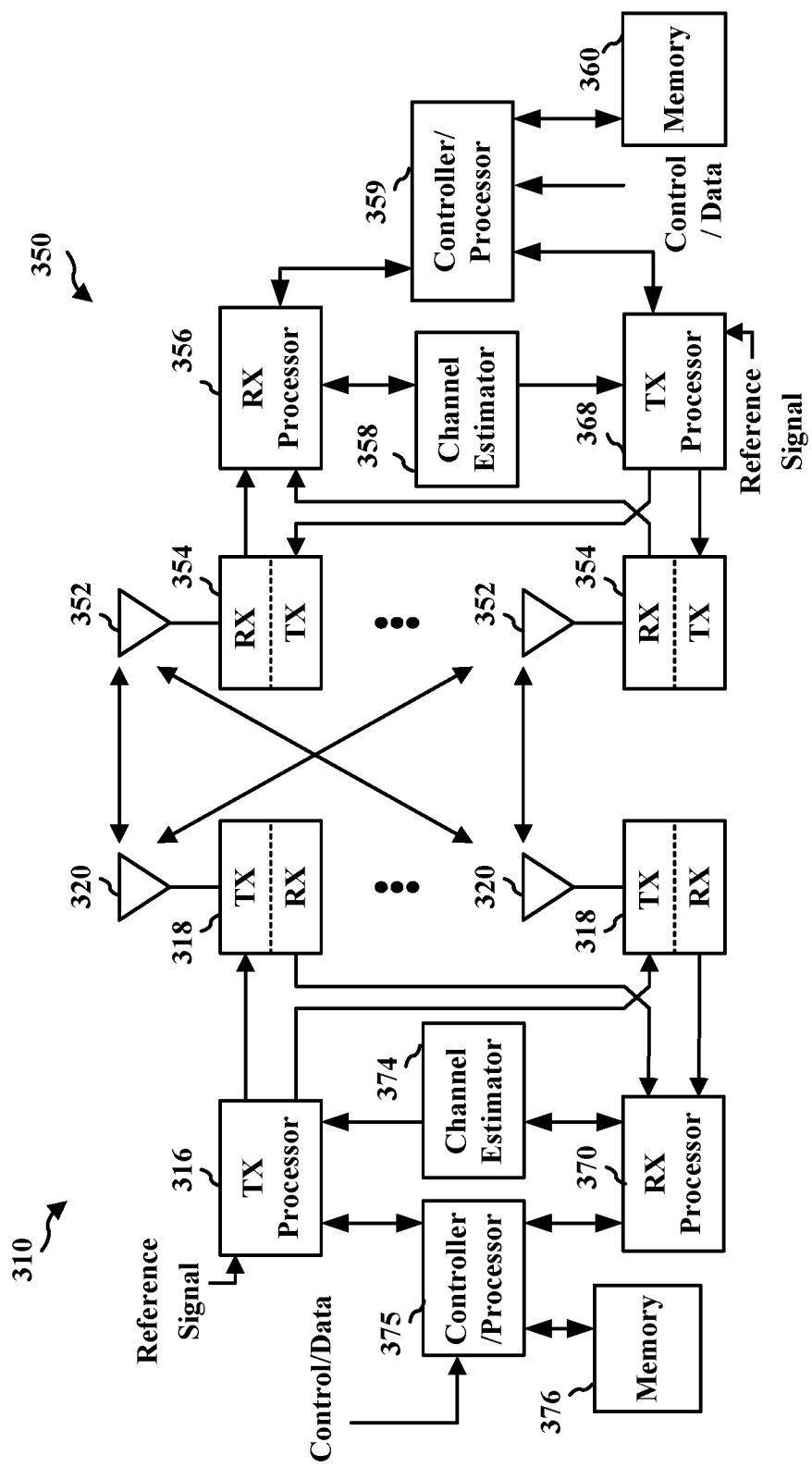
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 368, the RX processor 356, and the controller/processor 359 may be configured to perform aspects in connection with 199 of FIG. 1.

Some aspects of wireless communications, e.g., 5G NR, may introduce types of UEs with reduced capabilities (RedCap UEs). Also, due to a desire for NR to be scalable and deployable in a more efficient and cost-effective way, aspects of wireless communications, e.g., NR light, may introduce RedCap UEs by relaxing specifications for peak throughput, latency, and/or reliability. Further, aspects of wireless communications, e.g., NR superlight or enhanced RedCap, may focus on UE types with further reduced capabilities in order to support different use cases, e.g., low power wide area (LPWA) use cases. Aspects of wireless communications, e.g., NR superlight, may also introduce improvements in coverage, complexity, and power consumption for certain use cases, e.g., LPWA use cases. In some instances, certain aspects of wireless communications, e.g., NR superlight, may utilize low-power or low-complexity sidelink (SL) communications. Additional use cases for aspects of wireless communications, e.g., NR superlight, include metering devices, asset tracking, and/or personal internet of things (IoT) communication.

Some aspects of wireless communications, e.g., NR superlight, may be designed to minimize the complexity of UEs. Also, a UE bandwidth may need to be reduced from a baseline bandwidth, e.g., an NR baseline bandwidth. For instance, in certain types of wireless communications, e.g., NR, UEs may support one bandwidth, e.g., 100 MHz. In other types of wireless communications, e.g., NR light, UEs may support another bandwidth, e.g., 20 MHz. In yet other types of wireless communications, e.g., NR superlight, UEs may support yet another bandwidth, e.g., less than 20 MHz, e.g., 5 MHz or 10 MHz.

FIGS. 4A and 4B are diagrams 400 and 450, respectively, of single PUSCH scheduling and multiple PUSCH (multi-PUSCH) scheduling. As shown in FIG. 4A, diagram 400 includes single PUSCH scheduling with multiple uplink (UL) grants, e.g., UL grant 1, UL grant 2, and UL grant 3, as well as multiple PUSCHs, e.g., PUSCH1, PUSCH2, and PUSCH3. FIG. 4A also displays that a listen-before-talk (LBT) procedure occurs prior to each PUSCH. As shown in FIG. 4B, diagram 450 includes multi-PUSCH scheduling with one uplink (UL) grant, e.g., UL grant 1, as well as multiple PUSCHs, e.g., PUSCH1, PUSCH2, and PUSCH3. Further, FIG. 4B illustrates that an LBT procedure occurs prior to the multiple PUSCHs. FIGS. 4A and 4B show multi-PUSCH scheduling (FIG. 4B) can minimize a channel access overhead by including one listen-before-talk (LBT) procedure compared to single PUSCH scheduling (FIG. 4A) which utilizes multiple LBT procedures.

As shown in FIG. 4B, apart from an overhead benefit due to a reduced amount of LBT procedures, multi-PUSCH scheduling or multi-PDSCH scheduling may also be beneficial for reducing power consumption and/or DCI overhead. However, in certain types of wireless communication, e.g., types of NR, multi-PUSCH scheduling may have a limitation on continuous PUSCH transmissions. Also, multi-PDSCH scheduling may not be supported for these types of wireless communications, e.g., types of NR. As further shown in FIG. 4B, multi-PUSCH scheduling may minimize a channel access overhead by including one listen-before-talk (LBT) procedure for multiple PUSCH transmissions. In some instances, a time domain resource allocation (TDRA) in DCI, e.g., DCI 0_1, may indicate a combination of multiple PUSCHs, where candidate combinations may be configured by radio resource control (RRC) signaling. Moreover, multi-PUSCH scheduling may support a certain number of PUSCHs, e.g., up to 8 PUSCHs, that are continuous in time domain.

In some aspects, multi-PUSCH scheduling may include a number of different operations. For instance, a single DCI may schedule a number of PUSCHs, e.g., up to 8 PUSCHs, that are continuous in time domain. A time domain resource allocation (TDRA) table may also be configured by RRC signaling, where each row in the TDRA table may indicate one PUSCH or multiple PUSCHs. As shown in Table 1 below, the TDRA table may indicate a separate start and length indicator value (SLIV), mapping type, and repetition number per-PUSCH.

TABLE 1

| puschAllocationList | K2 | Sequence of pusch-Allocations | | | |
|---|---|---|---|---|---|
| 0 | K2_0 | SLIV0, type-A, rep 1 | | | |
| 1 | K2_1 | SLIV0, type-A, rep 1 | SLIV1, type-A, rep 1 | | |
| 2 | K2_2 | SLIV0, type-A, rep 1 | SLIV1, type-A, rep 1 | SLIV2, type-B, rep 2 | SLIV3, type-B, rep 2 |
| 3 | K2_3 | SLIV4, type-A, rep 1 | SLIV5, type-A, rep 2 | SLIV6, type-B, rep 4 | SLIV7, type-B, rep 8 |

In some instances, multi-PUSCH scheduling may be applicable to multiple PUSCHs that are continuous in time domain. Also, a time gap prior to a transmission of each of the multiple PUSCHs (time gap K2) may be applied to a first PUSCH. Certain types of DCI, e.g., DCI 0_1, may indicate a hybrid automatic repeat request (HARQ) process identifier (ID) for a first PUSCH, and the HARQ IDs may be incremented for subsequent PUSCHs. Further, certain types of DCI, e.g., DCI 0_1, may indicate a new data indicator (NDI) and/or a redundancy version (RV) and for all PUSCHs.

Based on the above, it may be beneficial to support multi-PUSCH and multi-PDSCH scheduling. It may also be beneficial to support multi-PUSCH/PDSCH scheduling for non-consecutive PUSCHs/PDSCHs and/or a time division duplex (TDD) configuration. Additionally, it may be beneficial to support time domain interleaving for multi-PUSCH and multi-PDSCH scheduling.

Aspects of the present disclosure may utilize multi-PUSCH scheduling and multi-PDSCH scheduling. Aspects of the present disclosure may also utilize multi-PUSCH/PDSCH scheduling for non-consecutive PUSCHs/PDSCHs and/or a TDD configuration. Further, aspects of the present disclosure may utilize time domain interleaving for multi-PUSCH scheduling and multi-PDSCH scheduling. By doing so, aspects of the present disclosure may provide a reduction in DCI overhead. Moreover, aspects of the present disclosure may provide a reduction in power consumed at a UE by reducing an amount of PDCCH monitoring, e.g., by configuring a longer PDCCH monitoring periodicity.

Aspects of the present disclosure may support multi-PUSCH scheduling or multi-PDSCH scheduling for non-consecutive or noncontiguous PUSCHs/PDSCHs. In some instances, aspects of the present disclosure may include a modified TDRA table configured via RRC signaling. For instance, the modified TDRA table may include a separate SLIV, mapping type, repetition number, and/or K2 value per PUSCH (or K0 value per PDSCH). Tables 2A and 2B below show TDRA tables indicating a separate SLIV, mapping type, and repetition number. Table 2A also shows a K2 value per PUSCH and Table 2B shows a K0 value per PDSCH.

TABLE 2A

| puschAllocationList | Sequence of pusch-Allocations | | | |
|---|---|---|---|---|
| 0 | SLIV0, type-A, rep 1, K2_0 | | | |
| 1 | SLIV0, type-A, rep 1, K2_0 | SLIV1, type-A, rep 1, K2_1 | | |
| 2 | SLIV0, type-A, rep 1, K2_0 | SLIV1, type-A, rep 1, K2_1 | SLIV2, type-B, rep 2, K2_2 | SLIV3, type-B, rep 2, K2_3 |
| 3 | SLIV4, type-A, rep 1, K2_0 | SLIV5, type-A, rep 2, K2_1 | SLIV6, type-B, rep 4, K2_2 | SLIV7, type-B, rep 8, K2_3 |

TABLE 2B

| pdschAllocationList | Sequence of pdsch-Allocations | | | |
|---|---|---|---|---|
| 0 | SLIV0, type-A, rep 1, K0_0 | | | |
| 1 | SLIV0, type-A, rep 1, K0_0 | SLIV1, type-A, rep 1, K0_1 | | |
| 2 | SLIV0, type-A, rep 1, K0_0 | SLIV1, type-A, rep 1, K0_1 | SLIV2, type-B, rep 2, K0_2 | SLIV3, type-B, rep 2, K0_3 |
| 3 | SLIV4, type-A, rep 1, K0_0 | SLIV5, type-A, rep 2, K0_1 | SLIV6, type-B, rep 4, K0_2 | SLIV7, type-B, rep 8, K0_3 |

There may be a number of possible interpretations of a K2 value for each PUSCH or K0 value for each PDSCH. For example, the K2/K0 value for each PUSCH/PDSCH may correspond to a time gap measured from the DCI to a transmission starting time of each PUSCH/PDSCH. Also, the K2/K0 value for each PUSCH/PDSCH may correspond to a time gap measured from a transmission ending time of a prior PUSCH/PDSCH to a transmission starting time of a current PUSCH/PDSCH. Moreover, the K2/K0 value for each PUSCH/PDSCH may fall within a constant K2/K0 range, such that the K2/K0 range may not be increased or decreased.

Figures 5A, 5B:
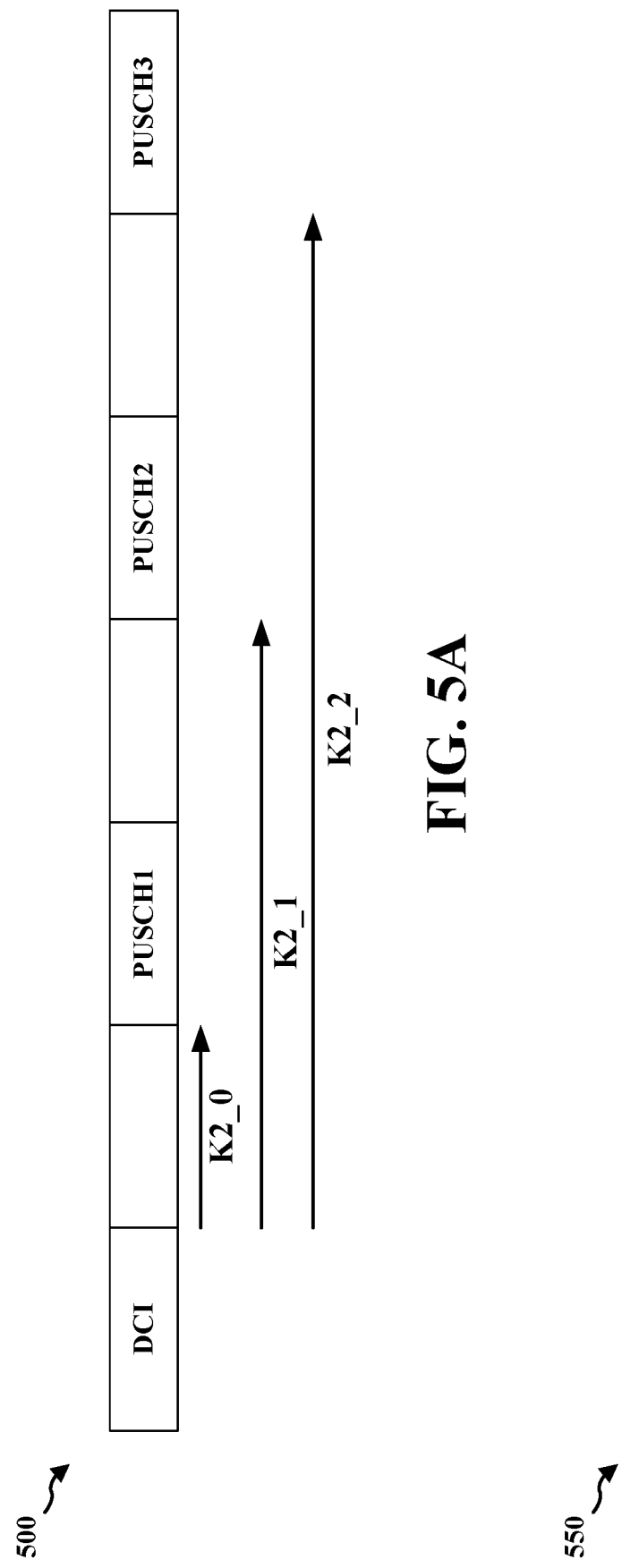
FIG. 5A is a diagram illustrating an example of multiple slots for multi-PUSCH scheduling.
FIG. 5B is a diagram illustrating an example of multiple slots for multi-PUSCH scheduling.

FIGS. 5A and 5B are diagrams 500 and 550, respectively, of multiple slots for multi-PUSCH scheduling including a time gap or K2 value between DCI and PUSCHs. FIG. 5A includes a slot for DCI and a slot for each PUSCH, e.g., a slot for PUSCH1, a slot for PUSCH2, and a slot for PUSCH3. As depicted in FIG. 5A, there is a slot between each PUSCH slot, such that the PUSCHs are noncontiguous. FIG. 5A also displays different K2 values, e.g., K2_0, K2_1, and K2_2, for each PUSCH. As shown in FIG. 5A, the K2 value for each PUSCH corresponds to a time gap measured from the DCI to a transmission starting time of each PUSCH. As indicated above, a K0 value can be utilized for each PDSCH.

Similar to FIG. 5A, FIG. 5B includes a slot for DCI and a slot for each PUSCH, e.g., a slot for PUSCH1, a slot for PUSCH2, and a slot for PUSCH3. Also, in FIG. 5B, there is a slot between each PUSCH slot, such that the PUSCHs are noncontiguous. FIG. 5B also displays different K2 values, e.g., K2_0, K2_1, and K2_2, for each PUSCH. As shown in FIG. 5B, the K2 value for each PUSCH may correspond to a time gap measured from a transmission ending time of a prior PUSCH to a transmission starting time of a current PUSCH.

In some aspects, for multi-PUSCH or multi-PDSCH scheduling for nonconsecutive or noncontiguous PUSCHs/PDSCHs, aspects of the present disclosure may include a mapping of uplink (UL) slots in a TDD configuration. For instance, each PUSCH may be mapped to each available UL slot. As such, special slots (i.e., S slots) or flexible slots (i.e., F slots) may not be used for a PUSCH. Also, consecutive slots may be used among available UL slots. Further, a same type of TDRA table may be utilized, which may indicate a separate SLIV, repetition number, mapping type, and/or K2 value per PUSCH (or K0 value per PDSCH). In some instances, aspects of the present disclosure may utilize both a TDRA table with a separate SLIV, repetition number, mapping type, and/or K2 value per PUSCH (or K0 value per PDSCH), as well as a K2/K0 value indicating a time gap from the slot of a previous PUSCH/PDSCH (i.e., counting solely UL/DL slots).

FIGS. 6A and 6B are diagrams 600 and 650, respectively, of multiple slots for multi-PUSCH scheduling including a time gap or K2 value between DCI and multiple PUSCHs. As shown in FIG. 6A, each PUSCH, e.g., PUSCH0, PUSCH1, PUSCH2, PUSCH3, is mapped to each available UL slot (U). Accordingly, special slots (S) are not used for a PUSCH in this figure. However, it is also possible to include special slots for PUSCH transmissions. The DCI is in a first downlink slot (D). As shown in FIG. 6A, the K2 value corresponds to a time gap measured from the DCI to a transmission starting time of each PUSCH, e.g., PUSCH0.

FIG. 6B shows that each PUSCH, e.g., PUSCH0, PUSCH1, PUSCH3, is mapped to an available UL slot (U). There is a blank uplink slot prior to the slot for PUSCH1. Similar to FIG. 6A, special slots (S) are not used for a PUSCH. In FIG. 6B, the K2 value for each PUSCH corresponds to a time gap measured from a transmission ending time of a prior PUSCH to a transmission starting time of a current PUSCH. Also, FIG. 6B may utilize a TDRA table with a separate SLIV, repetition number, mapping type, and/or K2 value per PUSCH (or K0 value per PDSCH).

Aspects of the present disclosure may also include a same repetition number that is configured for all PUSCHs scheduled by a DCI. For instance, the same repetition number may be configured for each row of a TRDA table, e.g., a puschAllocationList table. Also, the same repetition number may be indicated by DCI. In some aspects, if the repetition number is the same and multiple PUSCHs are scheduled by DCI, PUSCH slot interleaving may be enabled (e.g., via RRC signaling or DCI). There may also be an additional time diversity gain based on the same repetition number that is configured for all PUSCHs. Further, the same repetition number may be enabled for non-time sensitive traffic.

FIGS. 7A and 7B are diagrams 700 and 750, respectively, of multiple slots for multi-PUSCH scheduling including PUSCH slot scheduling without interleaving and PUSCH slot scheduling with interleaving. As shown in FIG. 7A, diagram 700 includes multiple slots for multi-PUSCH scheduling including PUSCH slot scheduling without interleaving. For instance, in FIG. 7A, each PUSCH type, e.g., PUSCH0, PUSCH1, PUSCH2, PUSCH3, is contiguous with similar PUSCH types. As shown in FIG. 7B, diagram 750 includes multiple slots for multi-PUSCH scheduling including PUSCH slot scheduling with interleaving. For example, in FIG. 7B, each PUSCH type, e.g., PUSCH0, PUSCH1, PUSCH2, PUSCH3, is interleaved with other PUSCH types.

Aspects of the present disclosure may support multi-PDSCH scheduling, which may be similar to multi-PUSCH scheduling. In aspects of multi-PDSCH scheduling, a single DCI can schedule a certain number of PDSCHs, e.g., up to 8 PDSCHs. Also, a TDRA table may be configured via RRC signaling, where each row in the TDRA table may indicate one or multiple PDSCHs. Additionally, the TDRA table may include a separate SLIV, repetition number, and/or mapping type per PDSCH. In some instances, certain types of DCI, e.g., DCI1_1, may indicate a HARQ process ID for a first PDSCH and a HARQ ID incremented for subsequent PDSCHs. Further, certain types of DCI, e.g., DCI1_1, may indicate an NDI and an RV for all of the PDSCHs. A number of different K0 values may be utilized for the PDSCHs. For instance, a different K0 value may be used for each PDSCH, or one K0 value may be used for the first PDSCH and a same K0 value may be used for subsequent PDSCHs.

Aspects of the present disclosure may utilize multi-PDSCH scheduling based on different types of code. For example, aspects of the present disclosure may utilize multi-PDSCH scheduling based on the following code:

```
PDSCH-TimeDomainResourceAllocationList ::= SEQUENCE (SIZE(1..maxNrofDL-Allocations)) OF
     PDSCH-TimeDomainResourceAllocation
PDSCH-TimeDomainResourceAllocation ::=        SEQUENCE {
    k0                                            INTEGER(0..32)
        OPTIONAL,   -- Need S
    mappingType                                   ENUMERATED {typeA, typeB},
    startSymbolAndLength                          INTEGER (0..127)
```

```
}
PDSCH-TimeDomainResourceAllocationList-r16 ::= SEQUENCE (SIZE(1..maxNrofDL-Allocations))
OF PDSCH-TimeDomainResourceAllocation-r16
PDSCH-TimeDomainResourceAllocation-r16 ::= SEQUENCE {
pdschAllocationList-r16            SEQUENCE (SIZE(1..maxNrofMultiplePDSCHs-r16)) OF
PDSCH-Allocation-r16,
...
}
PDSCH-Allocation-r16 ::= SEQUENCE {
  k0-r16                    INTEGER(0..32)  OPTIONAL,   -- Need S
  mappingType-r16           ENUMERATED {typeA, typeB},
  startSymbolAndLength-r16  INTEGER (0..127),
  repetitionNumber-r16      ENUMERATED {n2, n3, n4, n5, n6, n7, n8, n16}
OPTIONAL,   -- Cond Formats1-0and1-1
  ...
}
```

Aspects of the present disclosure may utilize HARQ acknowledgements (HARQ-ACKs) for the multiple PDSCHs in multi-PDSCH scheduling. In some instances, HARQ-ACKs may be bundled together for the PDSCHs that are scheduled by a same DCI. Also, UCI timing may be determined by the K1 value indicated by the same DCI. Further, K1 may indicate the gap between the UCI and the last PDSCH scheduled by the same DCI. In some aspects, slot interleaving may be enabled in multi-PDSCH scheduling, e.g., via RRC signaling or DCI.

FIGS. 8A and 8B are diagrams 800 and 850, respectively, of multiple slots for multi-PDSCH scheduling including a time gap or K1 value and PDSCH slot scheduling with interleaving. FIG. 8A shows that each PDSCH, e.g., PDSCH0, PDSCH1, PDSCH2, PDSCH3, is mapped to an available DL slot (D). Special slots (S) are not used for a PDSCH. In FIG. 8A, the K1 value indicates the gap between the UCI and the last PDSCH scheduled by the same DCI, e.g., PDSCH3. FIG. 8A also shows the UCI is in an uplink slot (U), where UCI timing is determined by the K1 value indicated by the same DCI.

As shown in FIG. 8B, diagram 850 includes multiple slots for multi-PDSCH scheduling including PDSCH slot scheduling with interleaving. For example, in FIG. 8B, each PDSCH type, e.g., PDSCH0, PDSCH1, PDSCH2, PDSCH3, is interleaved with other PDSCH types. As depicted in FIG. 8B, PDSCH slot interleaving may be enabled in multi-PDSCH scheduling, e.g., via RRC signaling or DCI.

Figure 9:
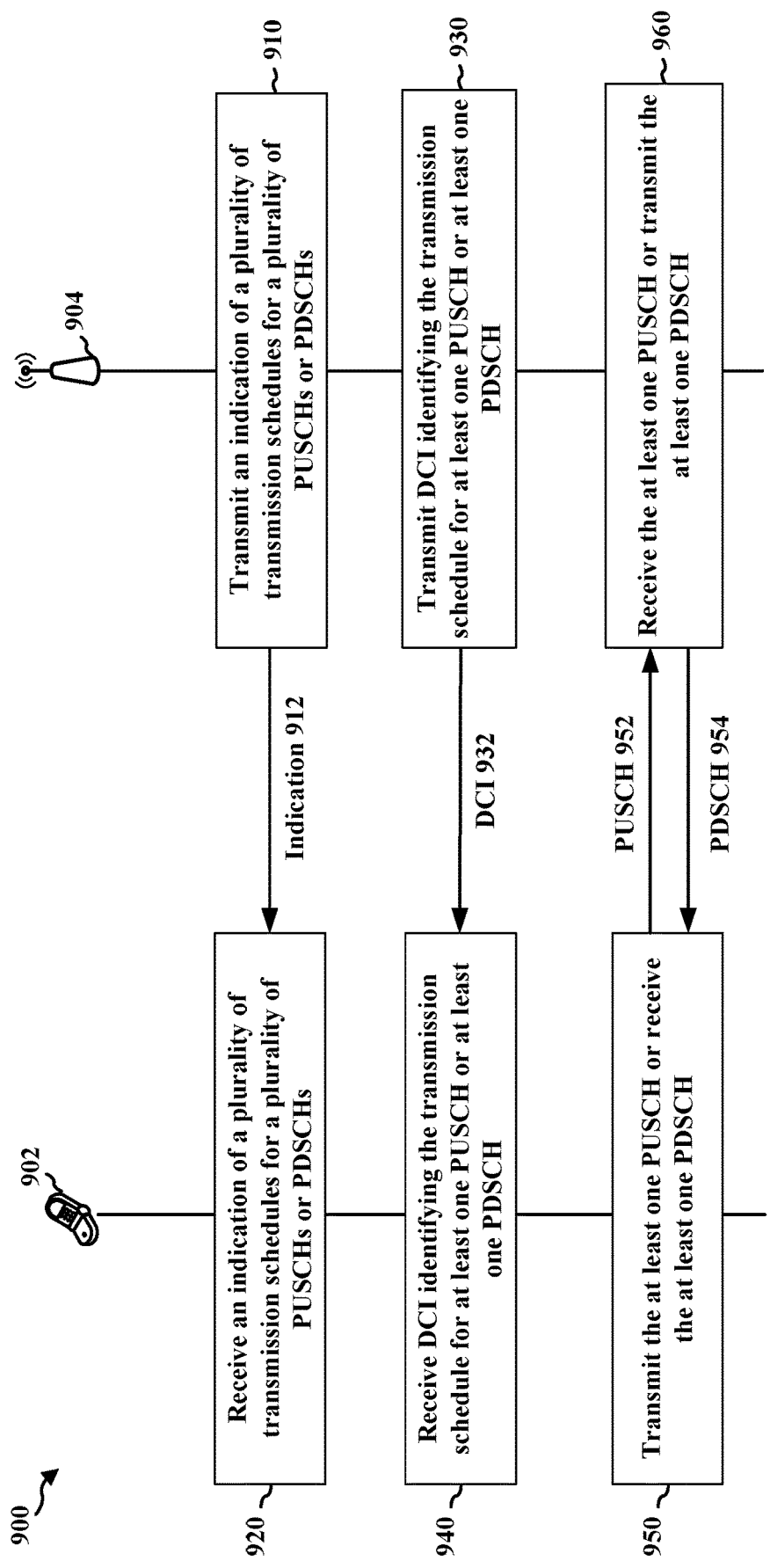
FIG. 9 is a diagram illustrating example communication between wireless devices.

FIG. 9 is a diagram 900 illustrating communication between UE 902 and base station 904. The UE 902 may correspond to UE 104, 350, and apparatus 1202. The base station 904 may correspond to base station 180, 310, and apparatus 1302.

At 910, base station 904 may transmit, to UE 902, an indication of a plurality of transmission schedules for at least one of a plurality of physical uplink shared channels (PUSCHs) or a plurality of physical downlink shared channels (PDSCHs), e.g., indication 912, the indication including a time gap prior to a transmission of each of the plurality of PUSCHs or each of the plurality of PDSCHs. In some aspects, a transmission schedule may be a transmission scheduling assignment, or vice versa. Also, a transmission schedule may be referred to as a transmission scheduling assignment, or vice versa.

At 920, UE 902 may receive, from base station 904, an indication of a plurality of transmission schedules for at least one of a plurality of physical uplink shared channels (PUSCHs) or a plurality of physical downlink shared channels (PDSCHs), e.g., indication 912, the indication including a time gap prior to a transmission of each of the plurality of PUSCHs or each of the plurality of PDSCHs.

In some aspects, the indication may be a time domain resource allocation (TDRA) table including one or more rows for each of the plurality of transmission schedules for the plurality of PUSCHs or the plurality of PDSCHs. The time gap prior to the transmission of each of the plurality of PUSCHs or each of the plurality of PDSCHs may correspond to a K2 value. Also, the time gap may be measured from the DCI to a transmission starting time of each of the plurality of PUSCHs or each of the plurality of PDSCHs, or is measured from a transmission ending time of a prior PUSCH or a prior PDSCH to a transmission starting time of a current PUSCH or a current PDSCH.

In some instances, each of the plurality of PUSCHs may be mapped to a next available uplink (UL) slot or each of the plurality of PDSCHs is mapped to a next available downlink (DL) slot. The indication may further include at least one of: a start and length indicator value (SLIV), a repetition number, or a mapping type of each of the plurality of PUSCHs or PDSCHs. Also, each of the plurality of PUSCHs or each of the plurality of PDSCHs may be noncontiguous or nonconsecutive. The indication may be received or transmitted via radio resource control (RRC) signaling.

At 930, base station 904 may transmit, to UE 902, downlink control information (DCI) identifying at least one transmission schedule for at least one PUSCH of the plurality of PUSCHs or at least one PDSCH of the plurality of PDSCHs, e.g., DCI 932.

At 940, UE 902 may receive, from base station 904, downlink control information (DCI) identifying at least one transmission schedule for at least one PUSCH of the plurality of PUSCHs or at least one PDSCH of the plurality of PDSCHs, e.g., DCI 932.

In some aspects, a same repetition number may be configured for the at least one PUSCH or the at least one PDSCH identified by the DCI. The indication may be a time domain resource allocation (TDRA) table and the same repetition number may be configured for each row in the TDRA table. The same repetition number may be indicated by the DCI. Also, PUSCH slot interleaving or PDSCH slot interleaving may be enabled if the plurality of PUSCHs or the plurality of PDSCHs including a same repetition number are identified by the DCI. The PUSCH slot interleaving or the PDSCH slot interleaving may be enabled via radio resource control (RRC) signaling or the DCI.

Additionally, a plurality of hybrid automatic repeat request (HARQ) acknowledgements (HARQ-ACKs) may be bundled for a plurality of PDSCHs scheduled by a same DCI. Further, a K1 value may correspond to a gap between a last PDSCH and a plurality of hybrid automatic repeat request (HARQ) acknowledgements (HARQ-ACKs) scheduled by a same DCI. A timing of a physical uplink control channel (PUCCH) or uplink control information (UCI) may be determined by the K1 value indicated by the same DCI.

At 950, UE 902 may transmit, to base station 904, the at least one PUSCH, e.g., PUSCH 952, or receive, from base station 904, the at least one PDSCH, e.g., PDSCH 954, based on the at least one transmission schedule in the received DCI.

At 960, base station 904 may receive, from UE 902, the at least one PUSCH, e.g., PUSCH 952, or transmit, to UE 902, the at least one PDSCH, e.g., PDSCH 954, based on the at least one transmission schedule in the transmitted DCI.

Figure 10:
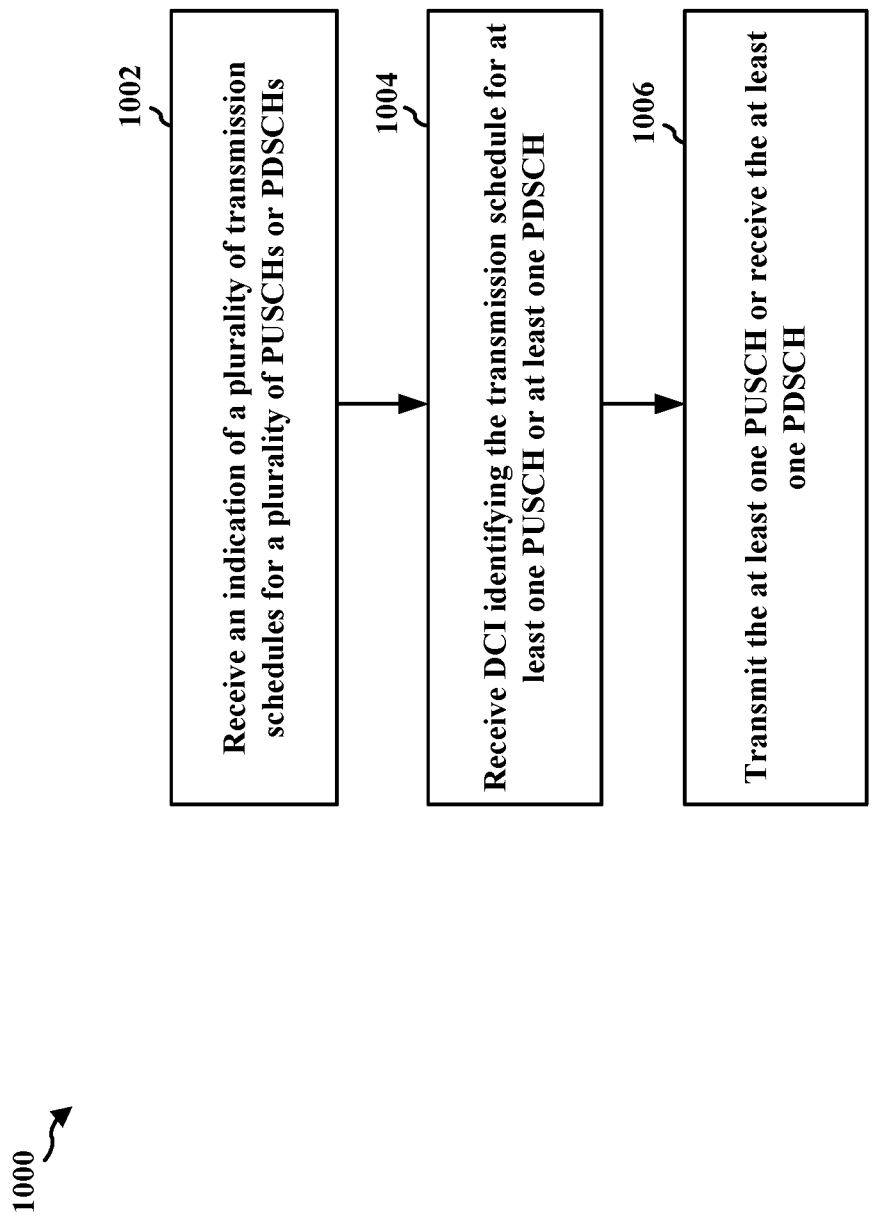
FIG. 10 is a flowchart of a method of wireless communication.

FIG. 10 is a flowchart 1000 of a method of wireless communication. The method may be performed by an apparatus, such as a UE or a component of a UE (e.g., the UE 104, 350, 902, and apparatus 1202). Optional aspects are illustrated with a dashed line. The methods described herein can provide a number of benefits, such as improving communication signaling, resource utilization, and/or power savings.

At 1002, the apparatus may receive, from a base station, an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs, as described in connection with the examples in FIGS. 4A-9. For example, as described in 920 of FIG. 9, UE 902 may receive, from a base station, an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs. Further, 1002 may be performed by determination component 1240 in FIG. 12.

In some aspects, the indication may be a time domain resource allocation (TDRA) table including one or more rows for each of the plurality of transmission schedules for the plurality of PUSCHs or the plurality of PDSCHs, as described in connection with the examples in FIGS. 4A-9. The time gap prior to the transmission of each of the plurality of PUSCHs or each of the plurality of PDSCHs may correspond to a K2 value, as described in connection with the examples in FIGS. 4A-9. Also, the time gap may be measured from the DCI to a transmission starting time of each of the plurality of PUSCHs or each of the plurality of PDSCHs, or is measured from a transmission ending time of a prior PUSCH or a prior PDSCH to a transmission starting time of a current PUSCH or a current PDSCH, as described in connection with the examples in FIGS. 4A-9.

In some instances, each of the plurality of PUSCHs may be mapped to a next available uplink (UL) slot or each of the plurality of PDSCHs is mapped to a next available downlink (DL) slot, as described in connection with the examples in FIGS. 4A-9. The indication may further include at least one of: a start and length indicator value (SLIV), a repetition number, or a mapping type of each of the plurality of PUSCHs or PDSCHs, as described in connection with the examples in FIGS. 4A-9. Also, each of the plurality of PUSCHs or each of the plurality of PDSCHs may be noncontiguous or nonconsecutive, as described in connection with the examples in FIGS. 4A-9. The indication may be received from the base station via radio resource control (RRC) signaling, as described in connection with the examples in FIGS. 4A-9.

At 1004, the apparatus may receive, from the base station, downlink control information (DCI) identifying at least one transmission schedule for at least one PUSCH of the plurality of PUSCHs or at least one PDSCH of the plurality of PDSCHs, as described in connection with the examples in FIGS. 4A-9. For example, as described in 940 of FIG. 9, UE 902 may receive, from the base station, downlink control information (DCI) identifying at least one transmission schedule for at least one PUSCH of the plurality of PUSCHs or at least one PDSCH of the plurality of PDSCHs. Further, 1004 may be performed by determination component 1240 in FIG. 12.

In some aspects, a same repetition number may be configured for the at least one PUSCH or the at least one PDSCH identified by the DCI, as described in connection with the examples in FIGS. 4A-9. The indication may be a time domain resource allocation (TDRA) table and the same repetition number may be configured for each row in the TDRA table, as described in connection with the examples in FIGS. 4A-9. The same repetition number may be indicated by the DCI, as described in connection with the examples in FIGS. 4A-9. Also, PUSCH slot interleaving or PDSCH slot interleaving may be enabled if the plurality of PUSCHs or the plurality of PDSCHs including a same repetition number are identified by the DCI, as described in connection with the examples in FIGS. 4A-9. The PUSCH slot interleaving or the PDSCH slot interleaving may be enabled via radio resource control (RRC) signaling or the DCI, as described in connection with the examples in FIGS. 4A-9.

Additionally, a plurality of hybrid automatic repeat request (HARQ) acknowledgements (HARQ-ACKs) may be bundled for a plurality of PDSCHs scheduled by a same DCI, as described in connection with the examples in FIGS. 4A-9. Further, a K1 value may correspond to a gap between a last PDSCH and a plurality of hybrid automatic repeat request (HARQ) acknowledgements (HARQ-ACKs) scheduled by a same DCI, as described in connection with the examples in FIGS. 4A-9. A timing of a physical uplink control channel (PUCCH) or uplink control information (UCI) may be determined by the K1 value indicated by the same DCI, as described in connection with the examples in FIGS. 4A-9.

At 1006, the apparatus may transmit, to the base station, the at least one PUSCH or receive, from the base station, the at least one PDSCH based on the at least one transmission schedule in the received DCI, as described in connection with the examples in FIGS. 4A-9. For example, as described in 950 of FIG. 9, UE 902 may transmit, to the base station, the at least one PUSCH or receive, from the base station, the at least one PDSCH based on the at least one transmission schedule in the received DCI. Further, 1006 may be performed by determination component 1240 in FIG. 12.

Figure 11:
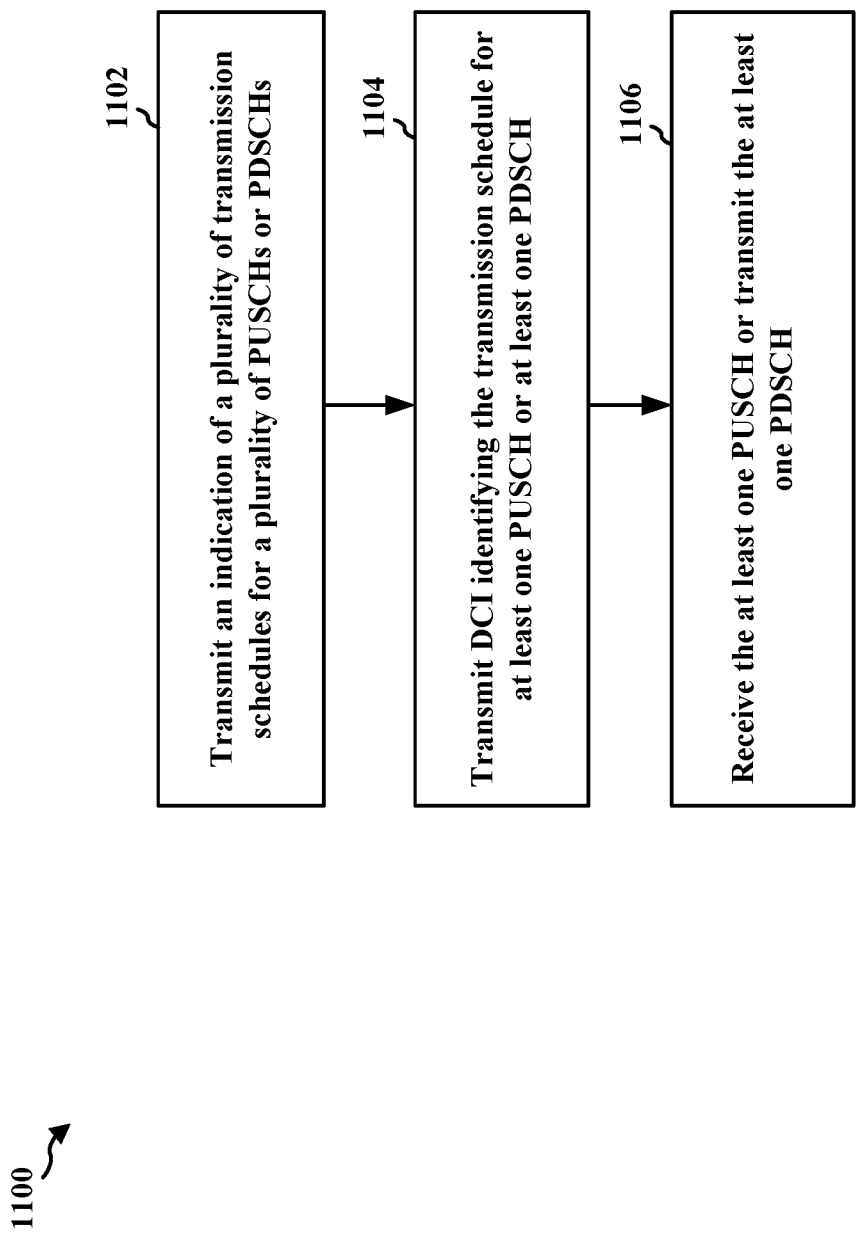
FIG. 11 is a flowchart of a method of wireless communication.

FIG. 11 is a flowchart 1100 of a method of wireless communication. The method may be performed by an apparatus, such as a base station or a component of a base station (e.g., the base station 102, 180, 310, 904; and apparatus 1302). Optional aspects are illustrated with a dashed line. The methods described herein can provide a number of benefits, such as improving communication signaling, resource utilization, and/or power savings.

At 1102, the apparatus may transmit, to a UE, an indication of a plurality of transmission schedules for at least one of a plurality of physical uplink shared channels (PUSCHs)

or a plurality of physical downlink shared channels (PD-SCHs), the indication including a time gap prior to a transmission of each of the plurality of PUSCHs or each of the plurality of PDSCHs, as described in connection with the examples in FIGS. 4A-9. For example, as described in 910 of FIG. 9, base station 904 may transmit, to a UE, an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs. Further, 1102 may be performed by determination component 1340 in FIG. 13.

In some aspects, the indication may be a time domain resource allocation (TDRA) table including one or more rows for each of the plurality of transmission schedules for the plurality of PUSCHs or the plurality of PDSCHs, as described in connection with the examples in FIGS. 4A-9. The time gap prior to the transmission of each of the plurality of PUSCHs or each of the plurality of PDSCHs may correspond to a K2 value, as described in connection with the examples in FIGS. 4A-9. Also, the time gap may be measured from the DCI to a transmission starting time of each of the plurality of PUSCHs or each of the plurality of PDSCHs, or is measured from a transmission ending time of a prior PUSCH or a prior PDSCH to a transmission starting time of a current PUSCH or a current PDSCH, as described in connection with the examples in FIGS. 4A-9.

In some instances, each of the plurality of PUSCHs may be mapped to a next available uplink (UL) slot or each of the plurality of PDSCHs is mapped to a next available downlink (DL) slot, as described in connection with the examples in FIGS. 4A-9. The indication may further include at least one of: a start and length indicator value (SLIV), a repetition number, or a mapping type of each of the plurality of PUSCHs or PDSCHs, as described in connection with the examples in FIGS. 4A-9. Also, each of the plurality of PUSCHs or each of the plurality of PDSCHs may be noncontiguous or nonconsecutive. The indication may be transmitted to the UE via radio resource control (RRC) signaling, as described in connection with the examples in FIGS. 4A-9.

At 1104, the apparatus may transmit, to the UE, downlink control information (DCI) identifying at least one transmission schedule for at least one PUSCH of the plurality of PUSCHs or at least one PDSCH of the plurality of PDSCHs, as described in connection with the examples in FIGS. 4A-9. For example, as described in 930 of FIG. 9, base station 904 may transmit, to the UE, downlink control information (DCI) identifying at least one transmission schedule for at least one PUSCH of the plurality of PUSCHs or at least one PDSCH of the plurality of PDSCHs. Further, 1104 may be performed by determination component 1340 in FIG. 13.

In some aspects, a same repetition number may be configured for the at least one PUSCH or the at least one PDSCH identified by the DCI, as described in connection with the examples in FIGS. 4A-9. The indication may be a time domain resource allocation (TDRA) table and the same repetition number may be configured for each row in the TDRA table, as described in connection with the examples in FIGS. 4A-9. The same repetition number may be indicated by the DCI, as described in connection with the examples in FIGS. 4A-9. Also, PUSCH slot interleaving or PDSCH slot interleaving may be enabled if the plurality of PUSCHs or the plurality of PDSCHs including a same repetition number are identified by the DCI, as described in connection with the examples in FIGS. 4A-9. The PUSCH slot interleaving or the PDSCH slot interleaving may be enabled via radio resource control (RRC) signaling or the DCI, as described in connection with the examples in FIGS. 4A-9.

Additionally, a plurality of hybrid automatic repeat request (HARQ) acknowledgements (HARQ-ACKs) may be bundled for a plurality of PDSCHs scheduled by a same DCI, as described in connection with the examples in FIGS. 4A-9. Further, a K1 value may correspond to a gap between a last PDSCH and a plurality of hybrid automatic repeat request (HARQ) acknowledgements (HARQ-ACKs) scheduled by a same DCI, as described in connection with the examples in FIGS. 4A-9. A timing of a physical uplink control channel (PUCCH) or uplink control information (UCI) may be determined by the K1 value indicated by the same DCI, as described in connection with the examples in FIGS. 4A-9.

At 1106, the apparatus may receive, from the UE, the at least one PUSCH or transmit, to the UE, the at least one PDSCH based on the at least one transmission schedule in the transmitted DCI, as described in connection with the examples in FIGS. 4A-9. For example, as described in 960 of FIG. 9, base station 904 may receive, from the UE, the at least one PUSCH or transmit, to the UE, the at least one PDSCH based on the at least one transmission schedule in the transmitted DCI. Further, 1106 may be performed by determination component 1340 in FIG. 13.

Figure 12:
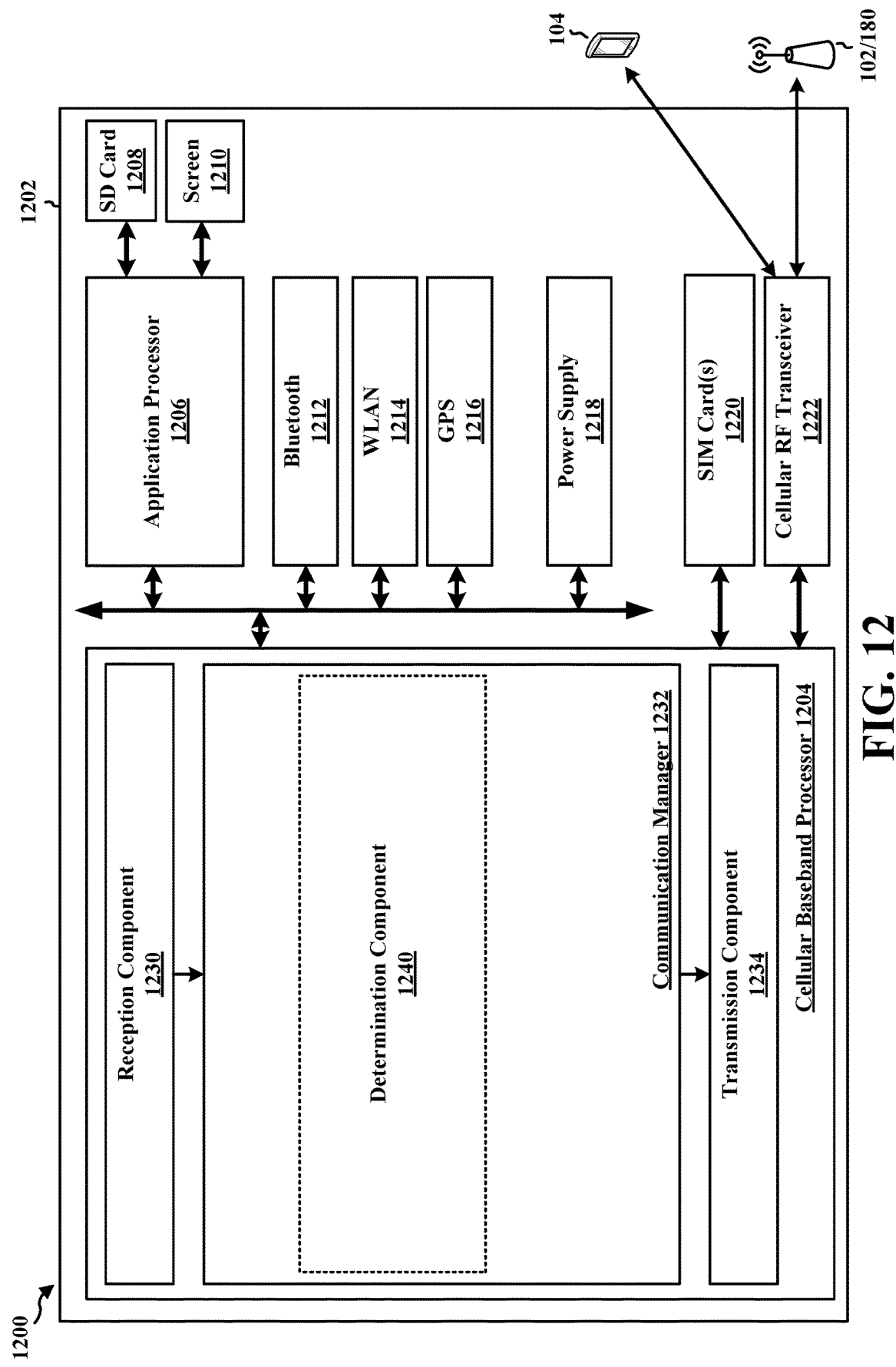
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a determination component 1240 that is configured to receive, from a base station, an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs, e.g., as described in connection with step 1002 in FIG. 10. Determination component 1240 may be further configured to receive, from the base station, downlink control information (DCI) identifying at least one transmission schedule for at least one PUSCH of the plurality of PUSCHs or at least one PDSCH of the plurality of PDSCHs, e.g., as described in connection with step 1004 in FIG. 10. Determination component 1240 may be further configured to transmit, to the base station, the at least one PUSCH or receive, from the base station, the at least one PDSCH based on the at least one transmission schedule in the received DCI, e.g., as described in connection with step 1006 in FIG. 10.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from a base station, an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs; means for receiving, from the base station, downlink control information (DCI) identifying at least one transmission schedule for at least one PUSCH of the plurality of PUSCHs or at least one PDSCH of the plurality of PDSCHs; and means for transmitting, to the base station, the at least one PUSCH or means for receiving, from the base station, the at least one PDSCH based on the at least one transmission schedule in the received DCI. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
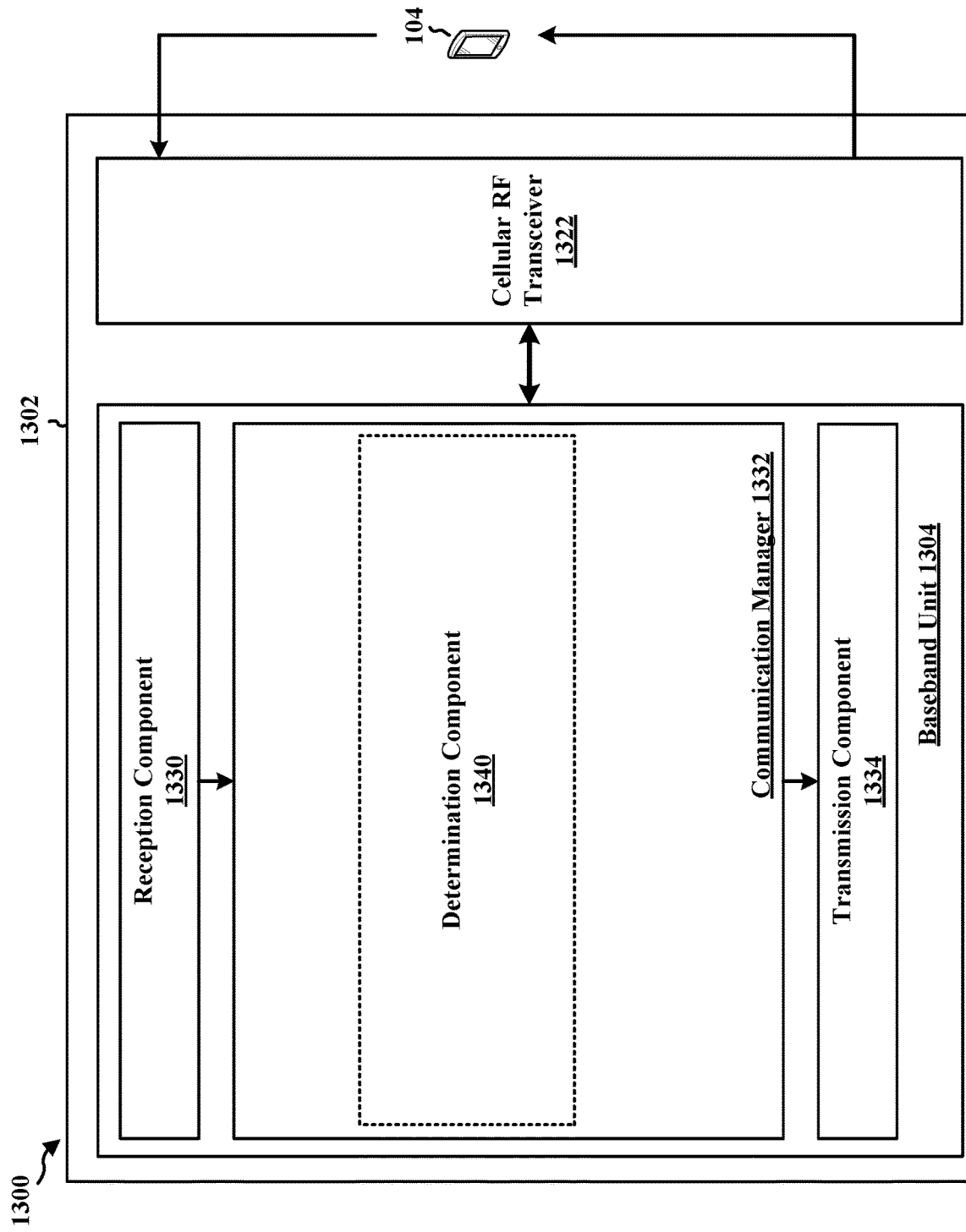
FIG. 13 is a diagram illustrating an example of a hardware implementation for an example apparatus.

FIG. 13 is a diagram 1300 illustrating an example of a hardware implementation for an apparatus 1302. The apparatus 1302 is a base station (BS) and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a determination component 1340 that is configured to transmit, to a user equipment (UE), an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs, e.g., as described in connection with step 1102 in FIG. 11. Determination component 1340 may be further configured to transmit, to the UE, downlink control information (DCI) identifying at least one transmission schedule for at least one PUSCH of the plurality of PUSCHs or at least one PDSCH of the plurality of PDSCHs, e.g., as described in connection with step 1104 in FIG. 11. Determination component 1340 may be further configured to receive, from the UE, the at least one PUSCH or transmit, to the UE, the at least one PDSCH based on the at least one transmission schedule in the transmitted DCI, e.g., as described in connection with step 1106 in FIG. 11.

The apparatus may include additional components that perform each of the blocks of the algorithm in the aforementioned flowcharts of FIGS. 9 and 11. As such, each block in the aforementioned flowcharts of FIGS. 9 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting, to a user equipment (UE), an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs; means for transmitting, to the UE, downlink control information (DCI) identifying at least one transmission schedule for at least one PUSCH of the plurality of PUSCHs or at least one PDSCH of the plurality of PDSCHs; and means for receiving, from the UE, the at least one PUSCH or means for transmitting, to the UE, the at least one PDSCH based on the at least one transmission schedule in the transmitted DCI. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE). The method includes receiving, from a base station, an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs; receiving, from the base station, downlink control information (DCI) identifying at least one transmission schedule for at least one PUSCH of the plurality of PUSCHs or at least one PDSCH of the plurality of PDSCHs; and transmitting, to the base station, the at least one PUSCH or receiving, from the base station, the at least one PDSCH based on the at least one transmission schedule in the received DCI.

Aspect 2 is the method of aspect 1, where the indication is a time domain resource allocation (TDRA) table including one or more rows for each of the plurality of transmission schedules for the plurality of PUSCHs or the plurality of PDSCHs.

Aspect 3 is the method of any of aspects 1 and 2, where the time gap prior to the transmission of each of the plurality of PUSCHs or each of the plurality of PDSCHs corresponds to a K2 value.

Aspect 4 is the method of any of aspects 1 to 3, where the time gap is measured from the DCI to a transmission starting time of each of the plurality of PUSCHs or each of the plurality of PDSCHs, or is measured from a transmission ending time of a prior PUSCH or a prior PDSCH to a transmission starting time of a current PUSCH or a current PDSCH.

Aspect 5 is the method of any of aspects 1 to 4, where each of the plurality of PUSCHs is mapped to a next available uplink (UL) slot or each of the plurality of PDSCHs is mapped to a next available downlink (DL) slot.

Aspect 6 is the method of any of aspects 1 to 5, where the indication further includes at least one of: a start and length indicator value (SLIV), a repetition number, or a mapping type of each of the plurality of PUSCHs or PDSCHs.

Aspect 7 is the method of any of aspects 1 to 6, where a same repetition number is configured for the at least one PUSCH or the at least one PDSCH identified by the DCI.

Aspect 8 is the method of any of aspects 1 to 7, where the indication is a time domain resource allocation (TDRA) table and the same repetition number is configured for each row in the TDRA table.

Aspect 9 is the method of any of aspects 1 to 8, where the same repetition number is indicated by the DCI.

Aspect 10 is the method of any of aspects 1 to 9, where PUSCH slot interleaving or PDSCH slot interleaving is enabled if the plurality of PUSCHs or the plurality of PDSCHs including a same repetition number are identified by the DCI.

Aspect 11 is the method of any of aspects 1 to 10, where the PUSCH slot interleaving or the PDSCH slot interleaving is enabled via radio resource control (RRC) signaling or the DCI.

Aspect 12 is the method of any of aspects 1 to 11, where a plurality of hybrid automatic repeat request (HARQ) acknowledgements (HARQ-ACKs) are bundled for a plurality of PDSCHs scheduled by a same DCI.

Aspect 13 is the method of any of aspects 1 to 12, where a K1 value corresponds to a gap between a last PDSCH and a plurality of hybrid automatic repeat request (HARQ) acknowledgements (HARQ-ACKs) scheduled by a same DCI.

Aspect 14 is the method of any of aspects 1 to 13, where a timing of a physical uplink control channel (PUCCH) or uplink control information (UCI) is determined by the K1 value indicated by the same DCI.

Aspect 15 is the method of any of aspects 1 to 14, where each of the plurality of PUSCHs or each of the plurality of PDSCHs are noncontiguous or nonconsecutive.

Aspect 16 is the method of any of aspects 1 to 15, where the indication is received from the base station via radio resource control (RRC) signaling.

Aspect 17 is an apparatus for wireless communication including at least one processor coupled to a memory and configured to implement a method as in any of aspects 1 to 16.

Aspect 18 is an apparatus for wireless communication including means for implementing a method as in any of aspects 1 to 16.

Aspect 19 is a computer-readable medium storing computer executable code, where the code when executed by a processor causes the processor to implement a method as in any of aspects 1 to 16.

Aspect 20 is a method of wireless communication at a base station. The method includes transmitting, to a user equipment (UE), an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs; transmitting, to the UE, downlink control information (DCI) identifying at least one transmission schedule for at least one PUSCH of the plurality of PUSCHs or at least one PDSCH of the plurality of PDSCHs; and receiving, from the UE, the at least one PUSCH or transmitting, to the UE, the at least one PDSCH based on the at least one transmission schedule in the transmitted DCI.

Aspect 21 is the method of aspect 20, where the indication is a time domain resource allocation (TDRA) table including one or more rows for each of the plurality of transmission schedules for the plurality of PUSCHs or the plurality of PDSCHs.

Aspect 22 is the method of any of aspects 20 to 21, where the time gap prior to the transmission of each of the plurality of PUSCHs or each of the plurality of PDSCHs corresponds to a K2 value.

Aspect 23 is the method of any of aspects 20 to 22, where the time gap is measured from the DCI to a transmission starting time of each of the plurality of PUSCHs or each of the plurality of PDSCHs, or is measured from a transmission ending time of a prior PUSCH or a prior PDSCH to a transmission starting time of a current PUSCH or a current PDSCH.

Aspect 24 is the method of any of aspects 20 to 23, where each of the plurality of PUSCHs is mapped to a next available uplink (UL) slot or each of the plurality of PDSCHs is mapped to a next available downlink (DL) slot.

Aspect 25 is the method of any of aspects 20 to 24, where the indication further includes at least one of: a start and length indicator value (SLIV), a repetition number, or a mapping type of each of the plurality of PUSCHs or PDSCHs.

Aspect 26 is the method of any of aspects 20 to 25, where a same repetition number is configured for the at least one PUSCH or the at least one PDSCH identified by the DCI.

Aspect 27 is the method of any of aspects 20 to 26, where the indication is a time domain resource allocation (TDRA) table and the same repetition number is configured for each row in the TDRA table.

Aspect 28 is the method of any of aspects 20 to 27, where the same repetition number is indicated by the DCI.

Aspect 29 is the method of any of aspects 20 to 28, where PUSCH slot interleaving or PDSCH slot interleaving is enabled if the plurality of PUSCHs or the plurality of PDSCHs including a same repetition number are identified by the DCI.

Aspect 30 is the method of any of aspects 20 to 29, where the PUSCH slot interleaving or the PDSCH slot interleaving is enabled via radio resource control (RRC) signaling or the DCI.

Aspect 31 is the method of any of aspects 20 to 30, where a plurality of hybrid automatic repeat request (HARD) acknowledgements (HARQ-ACKs) are bundled for a plurality of PDSCHs scheduled by a same DCI.

Aspect 32 is the method of any of aspects 20 to 31, where a K1 value corresponds to a gap between a last PDSCH and a plurality of hybrid automatic repeat request (HARD) acknowledgements (HARQ-ACKs) scheduled by a same DCI.

Aspect 33 is the method of any of aspects 20 to 32, where a timing of a physical uplink control channel (PUCCH) or uplink control information (UCI) is determined by the K1 value indicated by the same DCI.

Aspect 34 is the method of any of aspects 20 to 33, where each of the plurality of PUSCHs or each of the plurality of PDSCHs are noncontiguous or nonconsecutive.

Aspect 35 is the method of any of aspects 20 to 34, where the indication is transmitted to the UE via radio resource control (RRC) signaling.

Aspect 36 is an apparatus for wireless communication including at least one processor coupled to a memory and configured to implement a method as in any of aspects 20 to 35.

Aspect 37 is an apparatus for wireless communication including means for implementing a method as in any of aspects 20 to 35.

Aspect 38 is a computer-readable medium storing computer executable code, where the code when executed by a processor causes the processor to implement a method as in any of aspects 20 to 35.

What is claimed is:

1. An apparatus for wireless communication at a user equipment (UE), comprising:
    a memory; and
    at least one processor coupled to the memory and configured to:
        receive, from a base station, an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs;
        receive, from the base station, downlink control information (DCI) identifying at least one transmission schedule for a subset of PUSCHs of the plurality of PUSCHs or a subset of PDSCHs of the plurality of PDSCHs;
        transmit, to the base station, the subset of PUSCHs or receive, from the base station, the subset of PDSCHs based on the at least one transmission schedule in the received DCI; and
        transmit, to the base station, a plurality of hybrid automatic repeat request (HARQ) acknowledgements (HARQ-ACKs) based on the received subset of PDSCHs, wherein the plurality of HARQ-ACKs are bundled for the subset of PDSCHs scheduled by the DCI.

2. The apparatus of claim 1, wherein the indication is a time domain resource allocation (TDRA) table including one or more rows for each of the plurality of transmission schedules for the plurality of PUSCHs or the plurality of PDSCHs.

3. The apparatus of claim 1, wherein the time gap prior to the transmission of each of the plurality of PUSCHs or each of the plurality of PDSCHs corresponds to a K2 value.

4. The apparatus of claim 1, wherein the time gap is measured from the DCI to a transmission starting time of each of the plurality of PUSCHs or each of the plurality of PDSCHs, or is measured from a transmission ending time of a prior PUSCH or a prior PDSCH to a transmission starting time of a current PUSCH or a current PDSCH.

5. The apparatus of claim 1, wherein each of the plurality of PUSCHs is mapped to a next available uplink (UL) slot or each of the plurality of PDSCHs is mapped to a next available downlink (DL) slot.

6. The apparatus of claim 5, wherein the indication further includes at least one of: a start and length indicator value (SLIV), a repetition number, or a mapping type of each of the plurality of PUSCHs or PDSCHs.

7. The apparatus of claim 1, wherein a same repetition number is configured for the subset of PUSCHs or the subset of PDSCHs identified by the DCI.

8. The apparatus of claim 7, wherein the indication is a time domain resource allocation (TDRA) table and the same repetition number is configured for each row in the TDRA table.

9. The apparatus of claim 7, wherein the same repetition number is indicated by the DCI.

10. The apparatus of claim 1, wherein PUSCH slot interleaving or PDSCH slot interleaving is enabled if the plurality of PUSCHs or the plurality of PDSCHs including a same repetition number are identified by the DCI.

11. The apparatus of claim 10, wherein the PUSCH slot interleaving or the PDSCH slot interleaving is enabled via radio resource control (RRC) signaling or the DCI.

12. The apparatus of claim 1, wherein a K1 value corresponds to a gap between a last PDSCH and the plurality of HARQ-ACKs scheduled by the same DCI.

13. The apparatus of claim 12, wherein a timing of a physical uplink control channel (PUCCH) or uplink control information (UCI) is determined by the K1 value indicated by the same DCI.

14. The apparatus of claim 1, wherein each of the plurality of PUSCHs or each of the plurality of PDSCHs are non-contiguous or nonconsecutive.

15. The apparatus of claim 1, wherein the indication is received from the base station via radio resource control (RRC) signaling.

16. A method of wireless communication at a user equipment (UE), comprising:
receiving, from a base station, an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs;
receiving, from the base station, downlink control information (DCI) identifying at least one transmission schedule for a subset of PUSCHs of the plurality of PUSCHs or a subset of PDSCHs of the plurality of PDSCHs; and
transmitting, to the base station, the subset of PUSCHs or receiving, from the base station, the subset of PDSCHs based on the at least one transmission schedule in the received DCI; and transmitting, to the base station, a plurality of hybrid automatic repeat request (HARQ) acknowledgements (HARQ-ACKs) based on the received subset of PDSCHs, wherein the plurality of HARQ-ACKs are bundled for the subset of PDSCHs scheduled by the DCI.

17. An apparatus for wireless communication at a base station, comprising:
a memory; and
at least one processor coupled to the memory and configured to:
transmit, to a user equipment (UE), an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs;
transmit, to the UE, downlink control information (DCI) identifying at least one transmission schedule for a subset of PUSCHs of the plurality of PUSCHs or a subset of PDSCHs of the plurality of PDSCHs;
receive, from the UE, the subset of PUSCHs or transmit, to the UE, the subset of PDSCHs based on the at least one transmission schedule in the transmitted DCI; and
receive, from the UE, a plurality of hybrid automatic repeat request (HARQ) acknowledgements (HARQ-ACKs) based on the transmitted subset of PDSCHs, wherein the plurality of HARQ-ACKs are bundled for the subset of PDSCHs scheduled by the DCI.

18. The apparatus of claim 17, wherein the indication is a time domain resource allocation (TDRA) table including one or more rows for each of the plurality of transmission schedules for the plurality of PUSCHs or the plurality of PDSCHs.

19. The apparatus of claim 17, wherein the time gap prior to the transmission of each of the plurality of PUSCHs or each of the plurality of PDSCHs corresponds to a K2 value.

20. The apparatus of claim 17, wherein the time gap is measured from the DCI to a transmission starting time of each of the plurality of PUSCHs or each of the plurality of PDSCHs, or is measured from a transmission ending time of a prior PUSCH or a prior PDSCH to a transmission starting time of a current PUSCH or a current PDSCH.

21. The apparatus of claim 17, wherein each of the plurality of PUSCHs is mapped to a next available uplink (UL) slot or each of the plurality of PDSCHs is mapped to a next available downlink (DL) slot, wherein the indication further includes at least one of: a start and length indicator value (SLIV), a repetition number, or a mapping type of each of the plurality of PUSCHs or PDSCHs.

22. The apparatus of claim 17, wherein a same repetition number is configured for the subset of PUSCHs or the subset of PDSCHs identified by the DCI,
wherein the indication is a time domain resource allocation (TDRA) table and the same repetition number is configured for each row in the TDRA table.

23. The apparatus of claim 17, wherein a same repetition number is configured for the subset of PUSCHs or the subset of PDSCHs identified by the DCI,
wherein the same repetition number is indicated by the DCI.

24. The apparatus of claim 17, wherein PUSCH slot interleaving or PDSCH slot interleaving is enabled if the plurality of PUSCHs or the plurality of PDSCHs including a same repetition number are identified by the DCI, wherein the PUSCH slot interleaving or the PDSCH slot interleaving is enabled via radio resource control (RRC) signaling or the DCI.

25. The apparatus of claim 17, wherein a K1 value corresponds to a gap between a last PDSCH and the plurality of HARQ-ACKs scheduled by the same DCI, wherein a timing of a physical uplink control channel (PUCCH) or uplink control information (UCI) is determined by the K1 value indicated by the same DCI.

26. The apparatus of claim 17, wherein each of the plurality of PUSCHs or each of the plurality of PDSCHs are noncontiguous or nonconsecutive.

27. The apparatus of claim 17, wherein the indication is transmitted to the UE via radio resource control (RRC) signaling.

28. A method of wireless communication at a base station, comprising:
- transmitting, to a user equipment (UE), an indication of a plurality of transmission schedules for at least one of a plurality of physical uplink shared channels (PUSCHs) or a plurality of physical downlink shared channels (PDSCHs), the indication including a time gap prior to a transmission of each of the plurality of PUSCHs or each of the plurality of PDSCHs;
- transmitting, to the UE, downlink control information (DCI) identifying at least one transmission schedule for a subset of PUSCHs of the plurality of PUSCHs or a subset of PDSCHs of the plurality of PDSCHs;
- receiving, from the UE, the subset of PUSCHs or transmitting, to the UE, the subset of PDSCHs based on the at least one transmission schedule in the transmitted DCI; and
- receiving, from the UE, a plurality of hybrid automatic repeat request (HARQ) acknowledgements (HARQ-ACKs) based on the transmitted subset of PDSCHs, wherein the plurality of HARQ-ACKs are bundled for the subset of PDSCHs scheduled by the DCI.

* * * * *